US012686584B2

(12) United States Patent
Watanabe

(10) Patent No.: US 12,686,584 B2
(45) Date of Patent: Jul. 21, 2026

(54) SHEET SUPPORTING APPARATUS AND IMAGE FORMING SYSTEM

(71) Applicant: CANON KABUSHIKI KAISHA, Tokyo (JP)

(72) Inventor: Michinari Watanabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 18/643,326

(22) Filed: Apr. 23, 2024

(65) Prior Publication Data

US 2024/0367935 A1 Nov. 7, 2024

(30) Foreign Application Priority Data

May 1, 2023 (JP) ................................ 2023-075838

(51) Int. Cl.

| | |
|---|---|
| ***B41J 11/00*** | (2006.01) |
| ***B41J 13/22*** | (2006.01) |
| ***B65H 29/00*** | (2006.01) |
| ***B65H 29/04*** | (2006.01) |
| ***B65H 29/14*** | (2006.01) |
| ***B65H 29/70*** | (2006.01) |

(Continued)

(52) U.S. Cl.

CPC ........ *B65H 29/041* (2013.01); *B41J 11/0005* (2013.01); *B41J 11/0055* (2013.01); *B41J 13/223* (2013.01); *B65H 29/00* (2013.01); *B65H 29/14* (2013.01); *B65H 29/70* (2013.01); *B65H 31/02* (2013.01); *B65H 31/26* (2013.01)

(58) Field of Classification Search

CPC ...... B65H 29/041; B65H 29/00; B65H 29/14; B65H 29/70; B65H 31/02; B65H 31/26; B41J 11/0005; B41J 11/0055; B41J 13/223

See application file for complete search history.

(56) References Cited

U.S. PATENT DOCUMENTS

| | | | | |
|---|---|---|---|---|
| 2003/0218298 | A1 | 11/2003 | Yamakawa et al. | |
| 2012/0013069 | A1* | 1/2012 | Obuchi ................. | B65H 31/24 271/288 |
| 2020/0269563 | A1* | 8/2020 | Tham ..................... | B65H 23/12 |

FOREIGN PATENT DOCUMENTS

| | | | | |
|---|---|---|---|---|
| JP | 2003341908 A | 12/2003 | | |
| JP | 2007176689 A * | 7/2007 | ............ | B65H 29/52 |

(Continued)

*Primary Examiner* — Yaovi M Ameh

(74) *Attorney, Agent, or Firm* — ROSSI, KIMMS & McDOWELL LLP

(57) ABSTRACT

A sheet supporting apparatus includes a sheet discharge unit, a conveyance unit, a stacking unit, and a supporting unit. The sheet discharge unit conveys a sheet to discharge the sheet. The conveyance unit including a gripper member engaging with a leading edge of the sheet that has been discharged from the sheet discharge unit. The conveyance unit conveys the sheet engaged with the gripper member by moving the gripper member. The stacking unit is on which the sheet that has been conveyed by the conveyance unit is stacked. The supporting unit supports the sheet conveyed by the sheet discharge unit toward the gripper member by abutting against an undersurface of the sheet. The supporting unit is provided at a position where at least part of the supporting unit overlaps the gripper member in a sheet width direction perpendicular to a sheet discharge direction when viewed in the sheet discharge direction.

19 Claims, 9 Drawing Sheets

(51) Int. Cl.

| | |
|---|---|
| ***B65H 31/02*** | (2006.01) |
| ***B65H 31/26*** | (2006.01) |

(56) References Cited

FOREIGN PATENT DOCUMENTS

| | | | |
|---|---|---|---|
| JP | 2008094582 | A | 4/2008 |
| JP | 2013216418 | A | 10/2013 |

* cited by examiner

SHEET SUPPORTING APPARATUS AND IMAGE FORMING SYSTEM

BACKGROUND OF THE INVENTION

Field of the Invention

This disclosure relates to a sheet supporting apparatus that stacks a sheet on a stacking unit, and an image forming system.

Description of the Related Art

In image forming apparatuses such as, for example, printers performing commercial printing, for a purpose of performing image formation rapidly and in large quantities, sheet supporting apparatuses, also referred to as large capacity stackers, are disposed to store a large quantity of printed sheets. For such sheet supporting apparatuses, for a purpose of improving the alignment of the sheet, it is suggested to dispose gripper members that engage with a leading edge of the sheet to a circulating belt, and to convey the discharged sheet to a supporting position with the sheet engaged with the gripper members (refer to Japanese Patent Laid-Open No. 2003-341908).

However, in the sheet supporting apparatuses in which the sheet is engaged with the gripper members as described above, if, for example, the discharged sheet is made of thin paper or similar materials with insufficient stiffness, and is a sheet whose leading edge is susceptible to hang, there is a possibility that the leading edge of the sheet may become detached below the gripper members. If the leading edge of the sheet is not engaged with the gripper member as described above, there is a risk that the sheet may rub against an upper surface of the sheet that has been already stacked on the stacking unit, and thereby may disrupt the alignment of the sheet. This presents a problem in maintaining proper alignment.

Therefore, the purpose of the present disclosure is to provide the sheet supporting apparatus and an image forming system that can improve the alignment of the sheet stacked on the stacking unit.

SUMMARY OF THE INVENTION

According to a first aspect of the present invention, a sheet supporting apparatus includes a sheet discharge unit configured to convey a sheet to discharge the sheet, a conveyance unit including a gripper member configured to engage with a leading edge of the sheet that has been discharged from the sheet discharge unit, the conveyance unit being configured to convey the sheet engaged with the gripper member by moving the gripper member, a stacking unit on which the sheet that has been conveyed by the conveyance unit is stacked, and a supporting unit configured to support the sheet conveyed by the sheet discharge unit toward the gripper member by abutting against an undersurface of the sheet. The supporting unit is provided at a position where at least part of the supporting unit overlaps the gripper member in a sheet width direction perpendicular to a sheet discharge direction when viewed in the sheet discharge direction.

According to a second aspect of the present invention, an image forming system includes an image forming apparatus configured to form an image on a sheet, and the sheet supporting apparatus, the sheet supporting apparatus being configured to receive the sheet on which the image has been formed by the image forming apparatus and discharge the sheet from the sheet discharge unit.

Further features of the present invention will become apparent from the following description of exemplary embodiments with reference to the attached drawings.

DESCRIPTION OF THE EMBODIMENTS

First Embodiment

Hereinafter, using drawings, a first embodiment will be described. In the present embodiment, a case where an inkjet recording system 1 is applied as an image forming system will be described.

Inkjet Recording System

Figure 1:
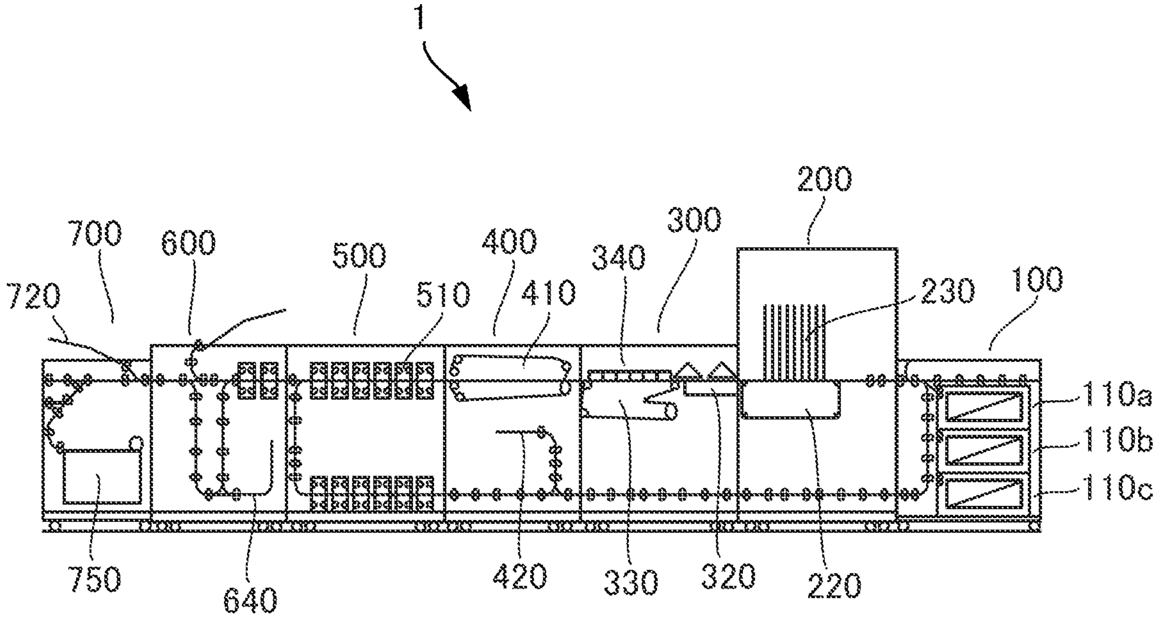
FIG. 1 is a schematic diagram illustrating a schematic configuration of an inkjet recording system of a first embodiment.

First, using FIG. 1, a schematic configuration of the inkjet recording system 1 of the first embodiment will be described. FIG. 1 is a schematic diagram illustrating the schematic configuration of the inkjet recording system 1 of the first embodiment. As the image forming system, the inkjet recording system 1 is a sheet-fed inkjet recording system that forms an ink image on a sheet S using a two-liquid system of reaction liquid and ink. As illustrated in FIG. 1, the inkjet recording system 1 is constituted from a feed module 100, a print module 200, a drying module 300, a fixing module 400, a cooling module 500, a reverse module 600, and a sheet discharge module 700. The sheet S, in a form of cut paper, supplied from the feed module 100 is conveyed along a sheet conveyance path, and, after having been processed in each module, is discharged at the sheet discharge module 700, serving as a sheet supporting apparatus.

The feed module 100 includes three storage compartments 110*a*, 110*b*, and 110*c* that store the sheet S. Each of the storage compartments 110*a*, 110*b*, and 110*c* is drawable toward a front side of the apparatus. In each of the storage compartments 110*a*, 110*b*, and 110*c*, the sheet S is fed by a separation belt, not shown, and a conveyance roller, one sheet at a time, and is conveyed to the print module 200. To be noted, the number of the storage compartments 110*a*, 110*b*, and 110*c* is not limited to three, and the feed module 100 may include one, or two, or equal to or more than four storage compartments.

The print module 200, serving as an image forming apparatus, includes a pre-image forming registration correction unit, not shown, a print belt unit 220, and a recording unit 230. The skew and a position of the sheet S that has been conveyed from the feed module 100 are corrected by the pre-image forming registration correction unit, and the sheet Sis conveyed to the print belt unit 220. The recording unit 230 is located at a position facing the print belt unit 220 with respect to the sheet conveyance path. The recording unit 230 is an image forming unit that forms an image on the sheet S by performing recording processing (printing) with respect to the sheet S using recording heads from above. The plurality of recording heads are arranged along a sheet conveyance direction. In the present embodiment, the recording unit 230 includes total of five line-type recording heads which corresponds to four colors: yellow (Y), magenta (M), cyan (C), and black (K), and an additional head for the reaction liquid added to these four colors. To be noted, the variety of colors and number of the recording heads are not respectively limited to four and five. To an inkjet method, methods using such as a heating element, a piezoelectric element, an electrostatic element, and a micro electromechanical system (MEMS) element can be adopted. The ink of each color is supplied from an ink tank, not shown, to each of the recording heads through an ink tube. The sheet S that has been printed in the recording unit 230 is conveyed while maintaining clearance with the recording heads by being adsorptively conveyed by the print belt unit 220. The sheet S that has been printed in the recording unit 230 is detected for the misalignment and the color density of the image formed on the sheet S by an inline scanner, not shown, located on a downstream side of the recording unit in the sheet conveyance direction. Detection results are utilized for the correction of the printed image.

The drying module 300 includes a decoupling portion 320, a drying belt unit 330, and a warm air blowing portion 340, and improves the fixability of the ink to the sheet S by reducing a liquid content in the ink applied onto the sheet S in the recording unit 230 of the print module 200. The sheet S that has been printed in the recording unit 230 of the print module 200 is conveyed to the decoupling portion 320 located on an upstream side of the drying module 300 in the sheet conveyance direction. In the decoupling portion 320, it is possible to convey the sheet S through the pressure of airflow from above and the friction of a belt. By softly securing the sheet S on the belt during conveyance, the displacement of the sheet S, where the ink image is formed, on the print belt unit 220 is prevented. The drying belt unit 330 and the warm air blowing portion 340 are respectively arranged below and above the belt in a manner facing each other across the belt. The sheet S that has been conveyed from the decoupling portion 320 is adsorptively conveyed on the drying belt unit 330, and, at the same time, an ink application surface of the sheet S is dried by receiving hot air from the warm air blowing portion 340. To be noted, as a method of drying, instead of applying the hot air, it is acceptable to irradiate the surface of the sheet S with electromagnetic waves (such as ultraviolet and infrared rays), or it is acceptable to utilize combined methods that involve conductive heat transfer through contact with a heating body.

The fixing module 400 includes a fixing belt unit 410. The fixing belt unit 410 includes an upper belt unit and a lower belt unit, and can fix the ink on the sheet S by passing the sheet S conveyed from the drying module 300 through a gap between the heated upper belt unit and the lower belt unit.

The cooling module 500 includes a plurality of cooling units 510, and cools a high temperature sheet S that has been conveyed from the fixing module 400. By drawing outside air into cooling boxes with fans to increase the internal pressure of the cooling boxes, the cooling units 510 cool the sheet S by blowing the air emitted through nozzles formed in a conveyance guide onto the sheet S. The cooling units 510 are arranged on both upper and lower sides with respect to the sheet conveyance path, and cool the sheet S from both surfaces.

Further, the cooling module 500 includes a conveyance path switching portion, and can switch the sheet conveyance path of the sheet S depending on whether the sheet is conveyed to the reverse module 600 or to a duplex conveyance path used during duplex printing. During the duplex printing, the sheet S is conveyed through a sheet conveyance path located in a lower section of the cooling module 500. In this case, from the cooling module 500, the sheet S is further conveyed along duplex conveyance paths of the fixing, drying, print, and feed modules 400, 300, 200, and 100. A first reverse portion 420 that reverses the front and back surfaces of the sheet S is disposed in the duplex conveyance path of the fixing module 400. Then, the sheet S is again conveyed from the feed module 100 to the pre-image forming registration correction unit of the print module 200, the print belt unit 220, and the recording unit 230, and is printed in the recording unit 230.

The reverse module 600 includes a second reverse portion 640, and can reverse the front and back surfaces of the discharged sheet S by reversing the front and back surfaces of the conveyed sheet S. The sheet discharge module 700 includes a top tray 720 and a stacking unit 750. The sheet discharge module 700 aligns and stacks the sheet S conveyed from the reverse module 600 onto the top tray 720 or the stacking unit 750, or discharges the sheet S to such as an external tray, not shown.

Configuration of Sheet Discharge Module

Figure 2:
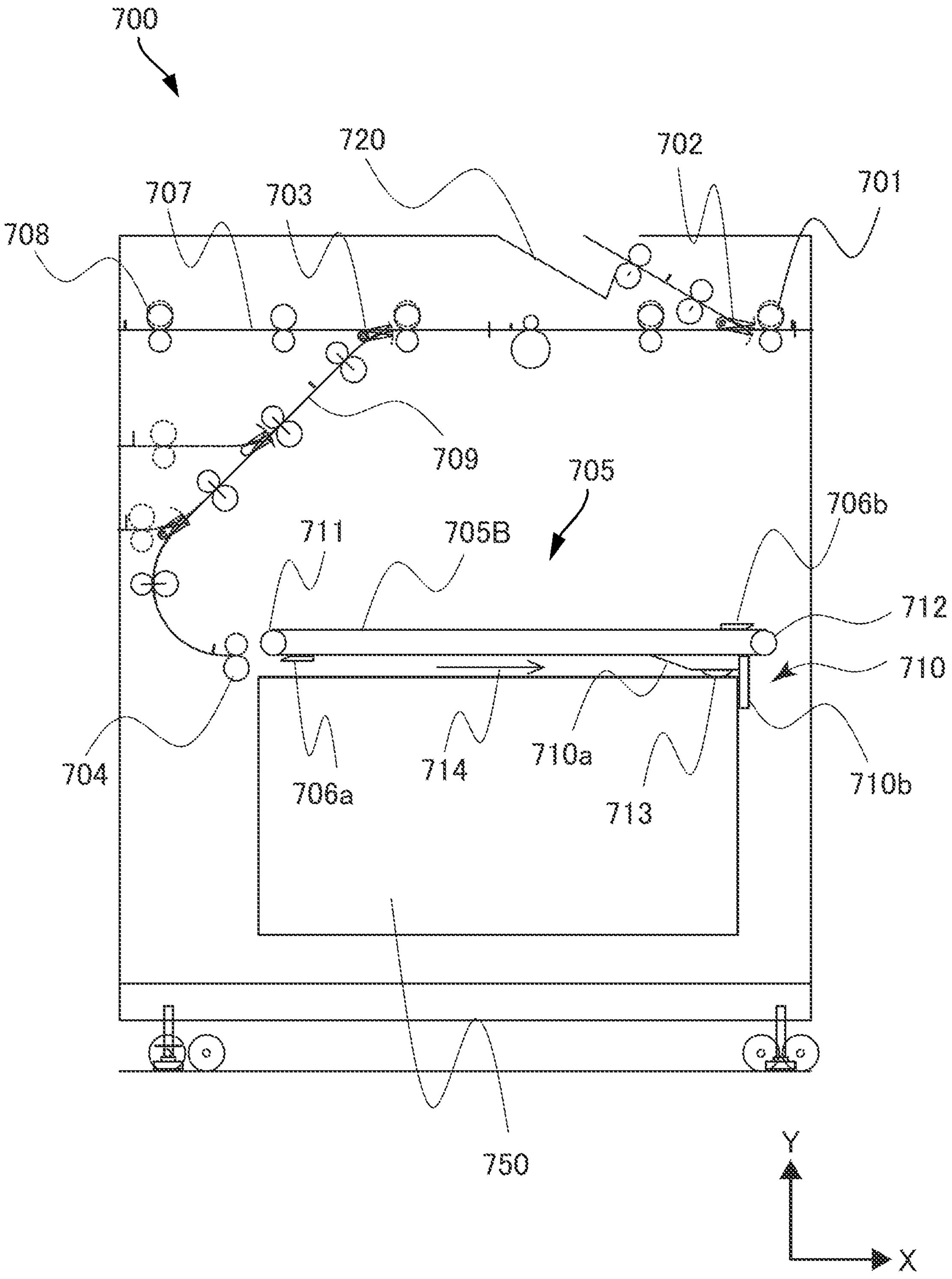
FIG. 2 is a schematic diagram illustrating a sheet discharge module of the first embodiment.

Next, using FIG. 2, a configuration of the sheet discharge module will be described. FIG. 2 is a schematic diagram illustrating the sheet discharge module of the first embodiment.

For example, in a case where a user specifies the top tray 720 as a sheet discharge destination of the sheet S, a control unit, not shown, drive controls a flapper 702 to pivot such that a tip of the flapper 702 faces downward. The sheet S is conveyed from the reverse module 600 into an inlet roller pair 701, and, by being guided by the flapper 702, is conveyed and discharged to the top tray 720.

Further, for example, in a case where, as the sheet discharge destination of the sheet S, the user specifies a post-processing apparatus, not shown, or a tray that is connected downstream of the sheet discharge module 700 in the sheet conveyance direction, the control unit, not shown, drive controls the flapper 702 and a flapper 703. That is, the flapper 702 is pivoted such that the tip of the flapper 702 faces upward, and the flapper 703 is pivoted such that the tip of the flapper 703 faces downward. Thereby, the sheet S is guided to a sheet conveyance path 707, and is conveyed (discharged) from an exit roller pair 708 to the post-processing apparatus, not shown.

Further, for example, in a case where the user specifies the stacking unit 750 as the sheet discharge destination of the sheet S, the control unit, not shown, drive controls the flappers 702 and 703. That is, the flapper 702 is pivoted such that the tip of the flapper 702 faces upward, and the flapper 703 is pivoted such that the tip of the flapper 703 faces upward. Thereby, the sheet S is guided to a sheet conveyance path 709 by the flappers 702 and 703, and is stacked on the stacking unit 750 from a sheet discharge roller pair 704. To be noted, while, also from the sheet conveyance path 709, two sheet conveyance paths through which the sheet S is discharged to the post-processing apparatus or a tray, not shown, that are connected downstream of the sheet discharge module 700 in the sheet conveyance direction are disposed, since the process is similar to the case where the sheet S is conveyed to the sheet conveyance path 707, the description will be omitted herein.

A conveyance mechanism 705, serving as a conveyance unit, is disposed downstream of the sheet discharge roller pair 704 in an X direction that is a sheet discharge direction in which the sheet S is discharged from the sheet discharge roller pair 704 to the stacking unit 750. In this embodiment, the sheet discharge direction is a horizontal direction. This conveyance mechanism 705 includes a drive pulley 712, a driven pulley 711, and a gripper belt 705B that is suspended between the drive and driven pulleys 712 and 711. These drive and driven pulleys 712 and 711 are examples of rotary members, and support the gripper belt 705B that is an example of a belt. The gripper belt 705B is rotatably driven in an arrow 714 direction when a driving force of a gripper belt motor, not shown, is transmitted to the drive pulley 712 through such as a gear mechanism. That is, the gripper belt 705B is rotatably driven such that a surface of the gripper belt 705B moves at a speed identical to a sheet conveyance speed.

Further, in the conveyance mechanism 705, grippers 706*a* and 706*b* that hold the sheet S between the grippers themselves and the gripper belt 705B by engaging with a leading edge of the sheet discharged from the sheet discharge roller pair 704 are attached to the gripper belt 705B. That is, these grippers 706*a* and 706*b* move in the arrow 714 direction integrally with the gripper belt 705B at the speed identical to the sheet conveyance speed. Then, by being held at the leading edge by the gripper 706*a* or 706*b*, the sheet S is moved (conveyed) above the stacking unit 750 along the sheet discharge direction to a predetermined position. To be noted, the conveyance mechanism 705, namely the grippers 706*a* and 706*b* and the gripper belt 705B, are disposed at a conveyance center CT (refer to FIG. 4) that is substantially at the center in a Y direction, which is a sheet width direction perpendicular to the sheet discharge direction. To be noted, the conveyance center CT is the center in the sheet width direction at the time when the sheet S is conveyed in the sheet discharge module 700 (that is, the center of a sheet conveyance path R in the sheet width direction). Further, in the present embodiment, the grippers 706*a* or 706*b* receives the leading edge of the sheet at a position lower than each of rotation centers of the drive and driven pulleys 712 and 711.

A leading edge stopper 710 abuts against the leading edge of the sheet S, and positions the sheet S with respect to the stacking unit 750. This leading edge stopper 710 includes an inclined surface 710*a* coming into contact with the sheet that is held by the gripper 706*a* or 706*b*, and a draw-in unit 713 constituted by such as a roller that draws in the sheet S. When the gripper 706*a* or 706*b* holding the sheet S has moved toward the leading edge stopper 710 by the rotation of the gripper belt 705B, subsequently, the leading edge of the sheet S engaged with and held by the gripper 706*a* or 706*b* comes into contact with the inclined surface 710*a* of the leading edge stopper 710. Then, when the leading edge of the sheet S comes into contact with the inclined surface 710*a*, the holding of the gripper 706*a* or 706*b* is unlocked (released). That is, the inclined surface 710*a* is an example of a contact portion. Further, after having been released from the gripper 706*a* or 706*b*, the sheet S is discharged toward the draw-in unit 713. Thereafter, the draw-in unit 713 brings the sheet S into contact with a contact surface 710*b*, so that the positioning of the leading edge of the sheet with respect to the stacking unit 750 is accomplished. Thereby, the sheet S is moved to the predetermined position (position where the leading edge of the sheet S is aligned with the contact surface 710*b*). To be noted, this predetermined position can be freely set by setting a position of the leading edge stopper 710 at any position above the stacking unit 750. Further, while, in the present embodiment, the leading edge stopper is fixed, in a case where the sheet S is stacked by the stacking unit 750 with an offset, it is conceivable to move the leading edge stopper 710 with each offset by such as a moving mechanism.

Figure 3:
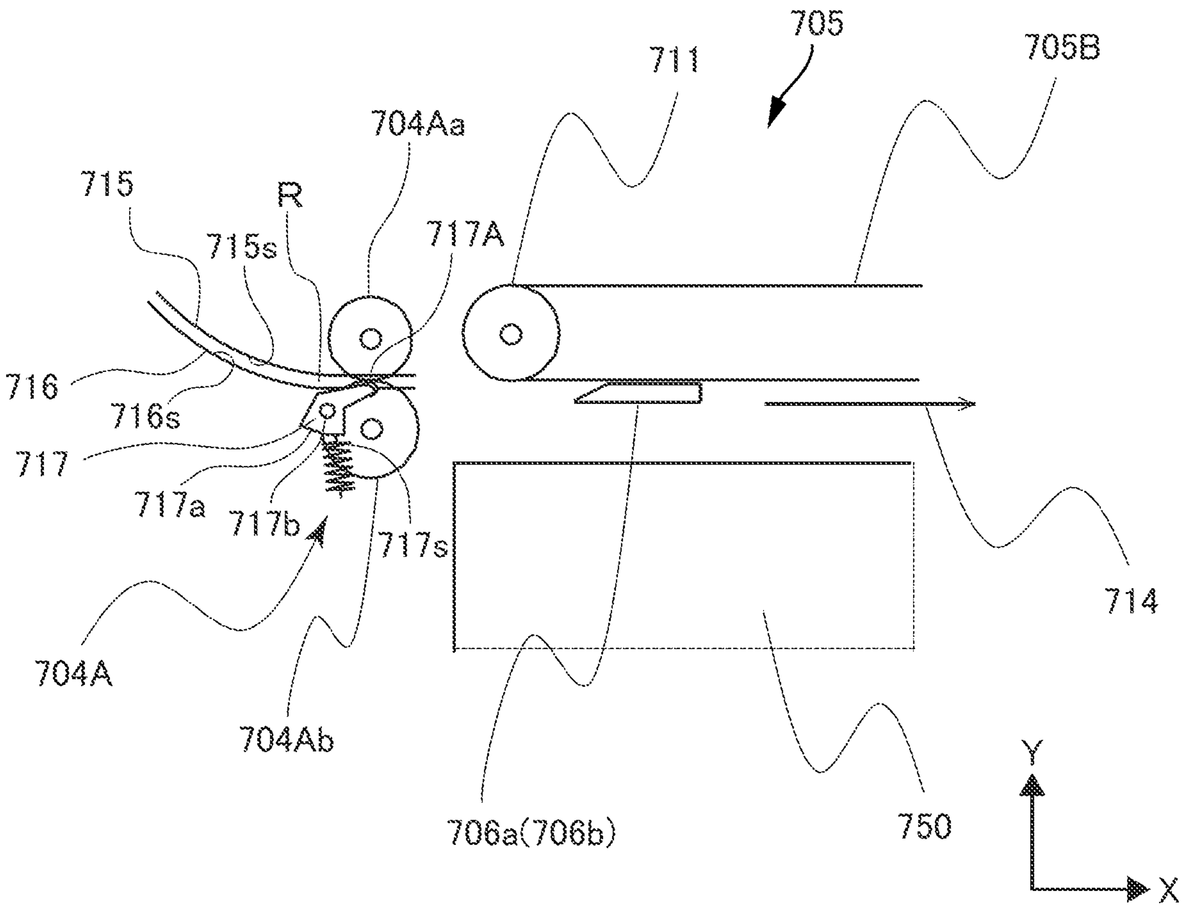
FIG. 3 is a schematic diagram illustrating an area adjacent to a sheet discharge roller pair in the sheet discharge module of the first embodiment.
Figure 4A:
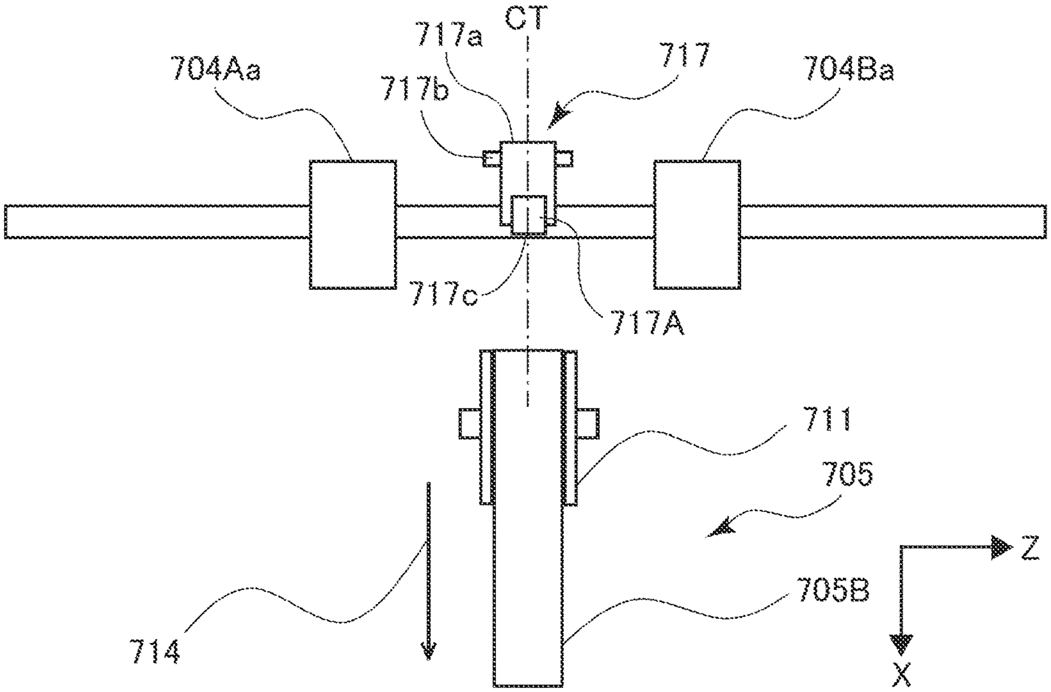
FIG. 4A is a schematic diagram illustrating a top view of the sheet discharge roller pairs, a stiffening unit, and a gripper belt in the sheet discharge module of the first embodiment.
Figure 4B:
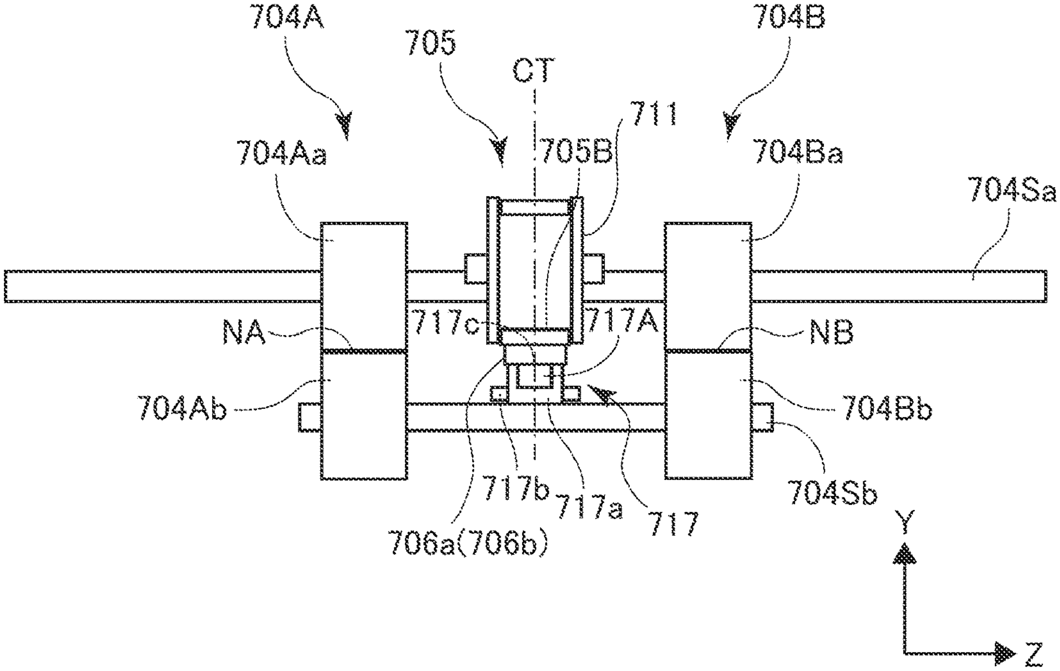
FIG. 4B is a schematic diagram illustrating a side view of the sheet discharge roller pairs, the stiffening unit, and the gripper belt in the sheet discharge module of the first embodiment.
Figure 5:
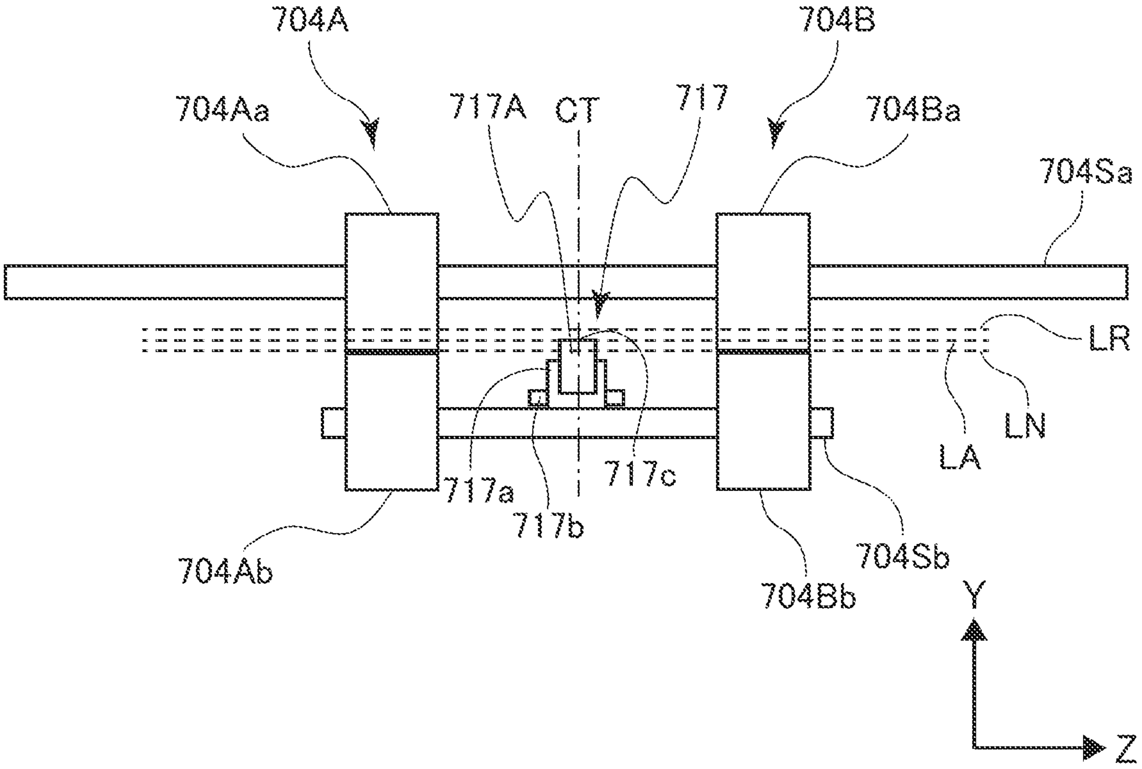
FIG. 5 is a schematic diagram illustrating the side view of the sheet discharge roller pairs and the stiffening unit in the sheet discharge module of the first embodiment.

Configuration of Sheet Discharge Unit and Adjacent Area of Sheet Discharge Module Next, using FIGS. 3, 4A, 4B, and 5, configurations of the sheet discharge roller pairs 704A and 704B, serving as sheet discharge units, and an area adjacent to the sheet discharge roller pairs 704A and 704B in the present embodiment will be described. FIG. 3 is a schematic diagram illustrating the area adjacent to the sheet discharge roller pairs in the sheet discharge module of the first embodiment. FIG. 4A is a schematic diagram illustrating a top view of the sheet discharge roller pairs, a stiffening unit, and the gripper belt in the sheet discharge module of the first embodiment. FIG. 4B is a schematic diagram illustrating a side view of the sheet discharge roller pairs, the stiffening unit, and the gripper belt in the sheet discharge module of the first embodiment. FIG. 5 is a schematic diagram illustrating the side view of the sheet discharge roller pairs and the stiffening unit in the sheet discharge module of the first embodiment. To be noted, FIG. 3 is an enlarged view illustrating a main part of FIG. 2. Further, FIG. 5 illustrates only the stiffening unit 717 and the sheet discharge roller pairs 704A and 704B by omitting the conveyance mechanism 705 from FIG. 4B.

As illustrated in FIGS. 4B and 5, the sheet discharge module 700 includes the sheet discharge roller pair 704A, serving as a first roller pair, and the sheet discharge roller pair 704B, serving as a second roller pair, provided in alignment with the sheet discharge roller pair 704A in the sheet width direction. The sheet discharge roller pair 704A includes a drive roller 704Aa, serving as a first roller, and a driven roller 704Ab, serving as a second roller that forms a first nip portion NA by coming into contact with the drive roller 704Aa. Further, the sheet discharge roller pair 704B includes a drive roller 704Ba, serving as a third roller, and a driven roller 704Bb, serving as a fourth roller that forms a second nip portion NB by coming into contact with the drive roller 704Ba. Among these rollers, the drive rollers 704Aa and 704Ba are secured to a drive shaft 704Sa, and are rotatably driven when the drive shaft 704Sa is driven by a motor, not shown. Further, the driven rollers 704Ab and 704Bb are secured to a rotation shaft 704Sb rotatably supported with respect to a frame, not shown, and are rotatably driven by the rotation of the drive rollers 704Aa and 704Ba.

On the other hand, as illustrated in FIG. 3, a sheet discharge upper guide 715, serving as a second guide, and a sheet discharge lower guide 716, serving as a first guide, are arranged in the sheet discharge module 700. The sheet discharge upper guide 715 and the sheet discharge lower guide 716 extend from an upstream side to a downstream side of the sheet discharge roller pairs 704A and 704B in the sheet discharge direction. The sheet discharge upper guide 715 and the sheet discharge lower guide 716 respectively include a guide surface 715*s*, serving as a second guide surface, and a guide surface 716*s*, serving as a first guide surface. That is, the guide surface 715*s* of the sheet discharge upper guide 715 is arranged to face the guide surface 716*s* of the sheet discharge lower guide 716, and these guide surfaces 715*s* and 716*s* form the sheet conveyance path R that guides the conveyed sheet S to the sheet discharge roller pairs 704A and 704B. In adjacent to the sheet discharge roller pairs 704A and 704B, the stiffening unit 717, serving as a first stiffening unit, for stiffening (increasing stiffness) the sheet S being discharged in the sheet conveyance direction is arranged in the sheet discharge lower guide 716 forming a bottom surface of the sheet conveyance path R. As illustrated in FIGS. 4A, 4B, and 5, the stiffening unit 717 is arranged on the conveyance center CT described above. That is, the stiffening unit 717 is arranged at a position overlapping the conveyance mechanism 705 (gripper belt 705B and grippers 706*a* and 706*b*) in the sheet width direction. The stiffening unit 717 is provided at a position where at least part of the stiffening unit 717 overlaps the grippers 706*a* and 706*b* in the sheet width direction when viewed in the sheet discharge direction.

As illustrated in FIGS. 4A and 4B, the stiffening unit 717, serving as a supporting unit, includes an abutment member 717A, serving as a moving member that abuts against the sheet S, and a body 717*a*, serving as a moving member, that supports the abutment member 717A. Further, a pivot shaft 717*b* is disposed in the body 717*a*. The body 717*a* is arranged pivotably around the pivot shaft 717*b*, serving as a pivot point. That is, the body 717*a* and the abutment member 717A (moving members) are arranged to be movable in a vertical direction. Then, the body 717*a* and the abutment member 717A are urged upward by a spring 717*s*, serving as an urging member. An upper surface of the abutment member 717A is an abutment surface 717*c*, serving as a first abutment surface, that abuts against the sheet S as the stiffening unit 717.

As illustrated in FIG. 5, an uppermost position of the abutment surface 717*c* is a position that comes into contact with an imaginary line LA in a Z direction, which is the vertical direction. Further, the uppermost position of the abutment surface 717*c* is above an imaginary line LN that passes through the first and second nip portions NA and NB of the sheet discharge roller pairs 704A and 704B. Further, the uppermost position of the abutment surface 717*c* is below an imaginary line LR that passes through the guide surface 715*s* of the sheet discharge upper guide 715, which is arranged above the stiffening unit 717 at a position at which the stiffening unit 717 is located. That is, the abutment surface 717*c* of the stiffening unit 717 projects above the first and second nip portions NA and NB, is located between the sheet discharge upper guide 715 and the sheet discharge lower guide 716 in the vertical direction, and is positioned below the guide surface 715*s* at a predetermined position in the sheet discharge direction. Here, the predetermined position is, for example, a position overlapping the sheet discharge roller pair 704A when viewed in the vertical direction. Thereby, the stiffening unit 717 bends the sheet S upward by abutting against an undersurface of the sheet S conveyed by the sheet discharge roller pairs 704A and 704B from below, and, when viewed in the sheet discharge direction, curves the sheet S upward, so that, in the sheet conveyance direction, the stiffening unit 717 stiffens the sheet S being discharged.

To be noted, the sheet discharged from the sheet discharge roller pairs 704A and 704B includes a sheet originally with sufficient stiffness. With respect to such a sheet, it is not necessary to further stiffen the sheet. Therefore, when discharging the sheet with the sufficient stiffness, the abutment member 717A of the stiffening unit 717 retracts downward by being pressed by the sheet, while resisting an urging force of the spring 717*s*. Thereby, the sheet with the sufficient stiffness is not further stiffened, and it is possible to convey (discharge) the sheet by not applying a load onto the sheet through the stiffening unit 717. To be noted, while, in the present embodiment, the abutment member 717A is urged upward by the spring 717*s*, it is not limited to this, and it is acceptable that the body 717*a* and the abutment member 717A remain stationary without pivoting.

Position of Stiffening Unit of Variant Example

Figure 8:
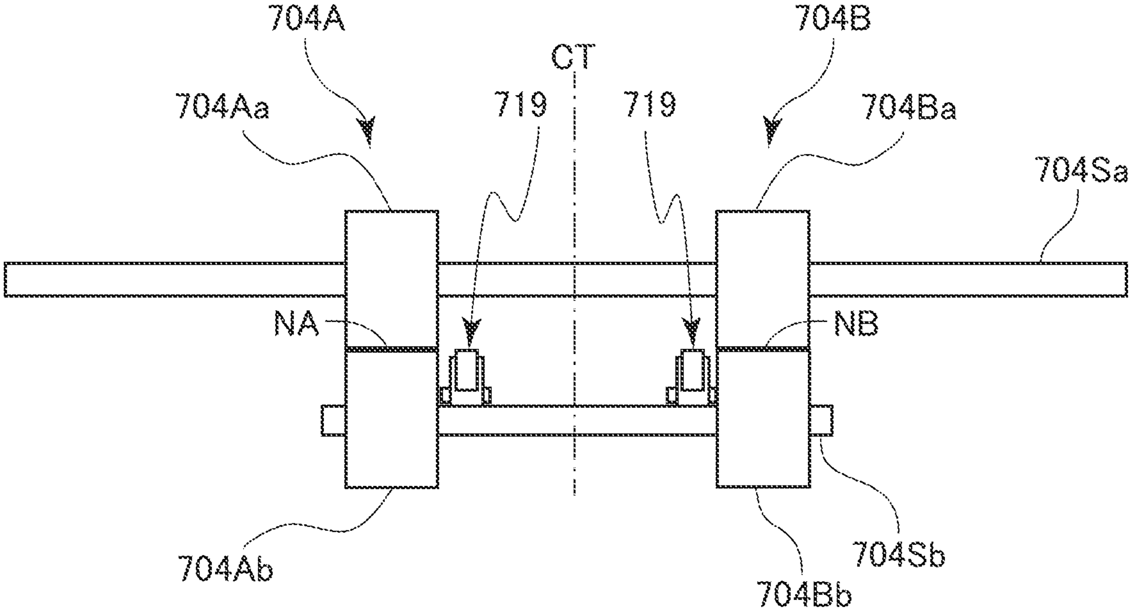
FIG. 8 is a schematic diagram illustrating a side view of sheet discharge roller pairs and stiffening units in a sheet discharge module of a variant example.
Figure 9A:
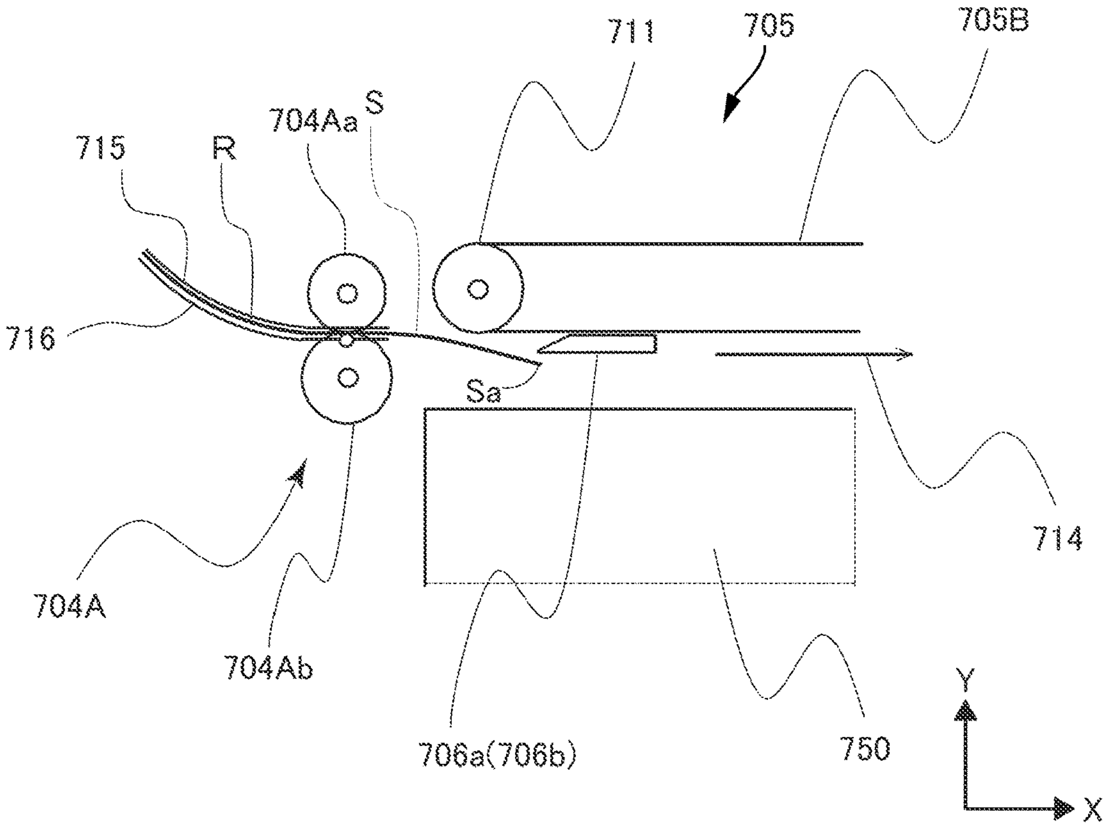
FIG. 9A is a schematic diagram illustrating a front view of a state in which a sheet is being discharged by the sheet discharge roller pairs in the sheet discharge module of the variant example.
Figure 9B:
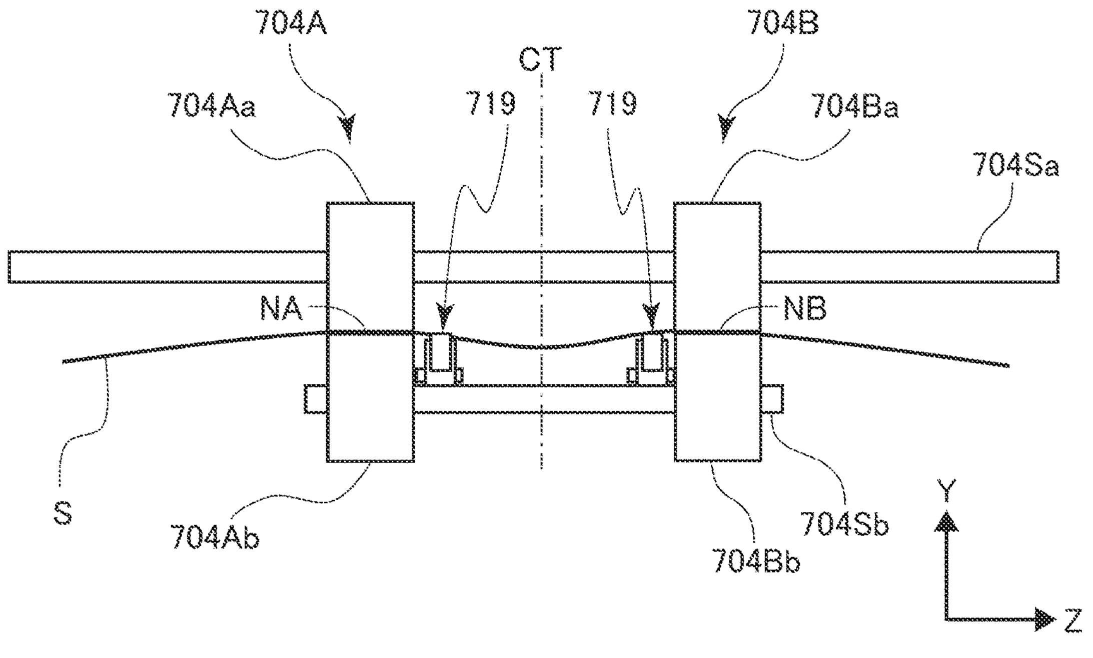
FIG. 9B is a schematic diagram illustrating a side view of the state in which the sheet is being discharged by the sheet discharge roller pairs in the sheet discharge module of the variant example.

Here, using FIGS. 8, 9A, and 9B, arrangement positions of stiffening units 719 in a sheet discharge module of a variant example, and a state in which the sheet S is discharged by the sheet discharge roller pairs 704A and 704B will be described. FIG. 8 is a schematic diagram illustrating a side view of the sheet discharge roller pairs and stiffening units of the variant example. FIG. 9A is a schematic diagram illustrating a front view of a state in which the sheet is discharged by the sheet discharge roller pairs in the sheet discharge module of the variant example. FIG. 9B is a schematic diagram illustrating a side view of the state in which the sheet is discharged by the sheet discharge roller pairs in the sheet discharge module of the variant example. To be noted, since a configuration of the stiffening unit 719 itself is identical to the configuration of the stiffening unit 717 described above, a detailed description of its configuration will be omitted herein.

As illustrated in FIG. 8, in the sheet discharge module of the variant example, the stiffening units 719 and 719 are arranged between the sheet discharge roller pairs 704A and 704B in the sheet width direction at two positions: adjacent to the sheet discharge roller pair 704A and adjacent to the sheet discharge roller pair 704B. Upper end positions at which the stiffening units 719 and 719 abut against the sheet are arranged slightly above the first and second nip portions NA and NB of the sheet discharge roller pairs 704A and 704B. In a case where the stiffening units 719 and 719 are arranged as described above, as illustrated in FIG. 9B, the sheet S is curved upward and downward in the sheet width direction due to differences in vertical positions between the first and second nip portions NA and NB of the sheet discharge roller pairs 704A and 704B, and the stiffening units 719 and 719. Thereby, the sheet S is stiffened, and becomes unlikely to generate such as a curl, so that it is possible to prevent the defective stacking of the sheet S onto the stacking unit 750.

However, the conveyance mechanism 705 (gripper belt 705B and grippers 706*a* and 706*b*), which is located at the position overlapping the conveyance center CT in the sheet width direction, does not overlap the stiffening units 719 and 719 in the sheet width direction. Therefore, as illustrated in FIGS. 9A and 9B, especially in a case of a sheet with insufficient stiffness, such as thin paper, the leading edge of the sheet is free in an area adjacent to the conveyance center CT, and hangs down. Then, there is a possibility that the sheet S may move underneath the grippers 706*a* and 706*b*, and may not be held by the grippers 706*a* and 706*b*. Therefore, the sheet S is not normally conveyed by the grippers 706*a* and 706*b*, and abuts against an uppermost sheet of a sheet bundle stacked on the stacking unit 750. This results in a problem where the sheet S fails to be stacked onto the stacking unit 750 in a neatly aligned state.

Position of Stiffening Unit in Present Embodiment

Figure 6A:
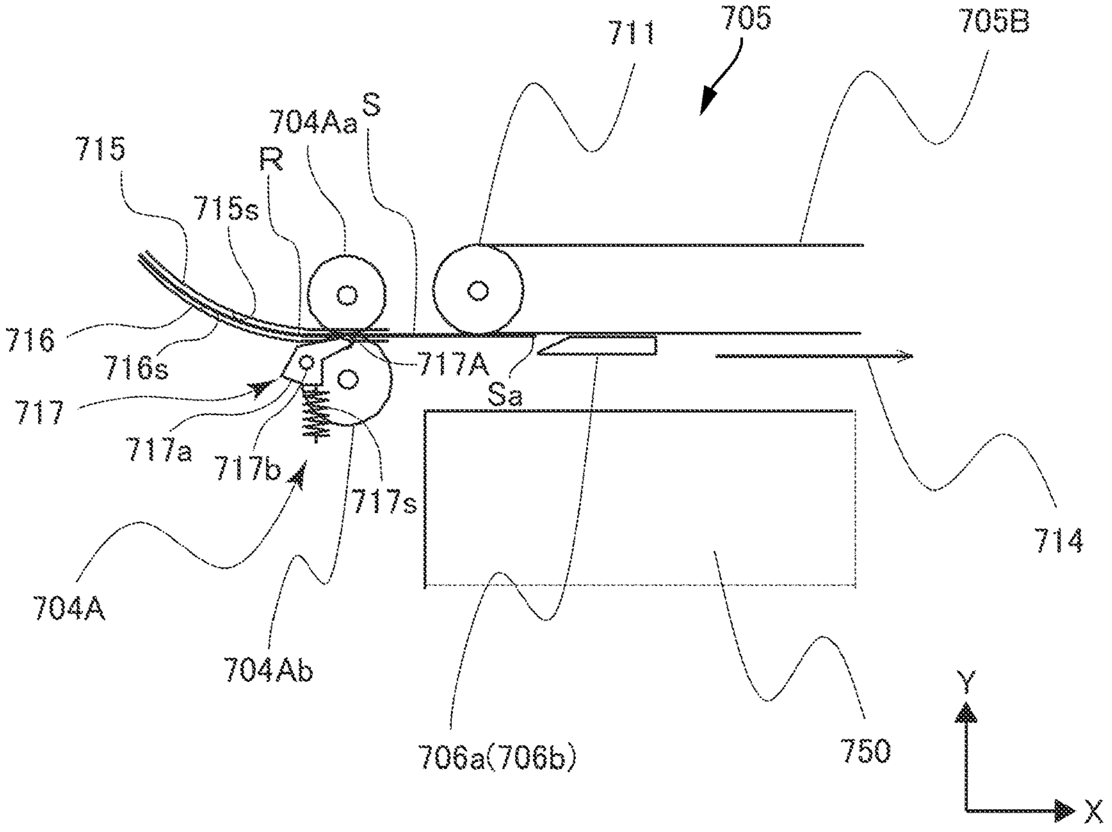
FIG. 6A is a schematic diagram illustrating a front view of a state in which a sheet is being discharged by the sheet discharge roller pairs in the sheet discharge module of the first embodiment.
Figure 6B:
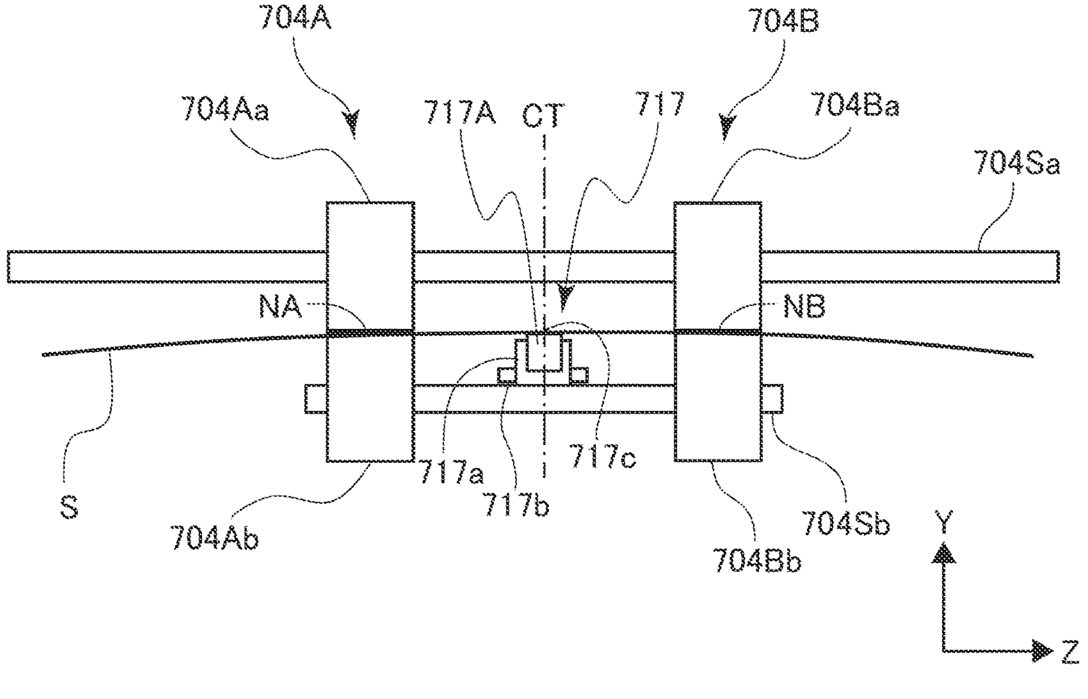
FIG. 6B is a schematic diagram illustrating a side view of the state in which the sheet is being discharged by the sheet discharge roller pairs in the sheet discharge module of the first embodiment.

Next, using FIGS. 6A and 6B, an arrangement position of the stiffening unit 717 in the sheet discharge module 700 of the first embodiment, and a state in which the sheet S is discharged by the sheet discharge roller pairs 704A and 704B will be described. FIG. 6A is a schematic diagram illustrating a front view of the state in which the sheet is discharged by the sheet discharge roller pairs in the sheet discharge module of the first embodiment. FIG. 6B is a schematic diagram illustrating a side view of the state in which the sheet is discharged by the sheet discharge roller pairs in the sheet discharge module of the first embodiment.

As described above, in the first embodiment, the stiffening unit 717 is located at the position overlapping the conveyance center CT in the sheet width direction. That is, the stiffening unit 717 is arranged at the position overlapping the gripper belt 705B and the grippers 706*a* and 706*b* in the sheet width direction. Further, the abutment surface 717*c* of the stiffening unit 717 is arranged slightly above the first and second nip portions NA and NB of the sheet discharge roller pairs 704A and 704B. That is, the abutment surface 717*c* of the stiffening unit 717 abuts against the sheet S from below, and supports the sheet S in a way that prevents the sheet from hanging down. In other words, the abutment surface 717*c* supports the sheet S by abutting against the sheet S, which is being discharged from the sheet discharge roller pairs 704A and 704B, and is moving toward the gripper 706*a* or 706*b*, from below, Therefore, as illustrated in FIG. 6B, even in the case of the sheet with the insufficient stiffness, such as, for example, the thin paper, the leading edge Sa of the sheet is curved upward, namely stiffened, in an area adjacent to the conveyance center CT. Therefore, it becomes unlikely for the sheet to generate such as a curl, and the prevention of the defective stacking of the sheet S onto the stacking unit 750 is ensured. Further, at a predetermined position in the sheet discharge direction, the abutment surface 717*c* of the stiffening unit 717 is arranged above the guide surface 716*s*. Here, the predetermined position is, for example, a position overlapping the sheet discharge roller pair 704A when viewed in the vertical direction.

Then, as illustrated in FIG. 6A, the leading edge Sa of the sheet S, which is stiffened by being pressed upward at the conveyance center CT, is conveyed to a position between the gripper belt 705B and the gripper 706*a* or 706*b* without hanging down. That is, when the sheet S is discharged by the sheet discharge roller pairs 704A and 704B, in a state in which a central portion of the sheet S in the sheet width direction is supported by the stiffening unit 717 from below, the sheet S is conveyed to the position between the gripper belt 705B and the gripper 706*a* or 706*b*. Thereby, the leading edge Sa of the sheet S is securely engaged with and held by the grippers 706*a* or 706*b*, and, by the rotation of the gripper belt 705B, is conveyed to the predetermined position set by the leading edge stopper 710. Therefore, without causing the leading edge Sa of the sheet S to rub against the upper surface of the sheet bundle stacked on the stacking unit 750, the leading edge Sa of the sheet S is conveyed to a normal position, and discharged onto the sheet bundle. That is, the sheet S is stacked on the stacking unit 750 in a neatly aligned manner. In other words, it is possible to improve the alignment of the sheet that is stacked on the stacking unit 750.

Second Embodiment

Figure 7:
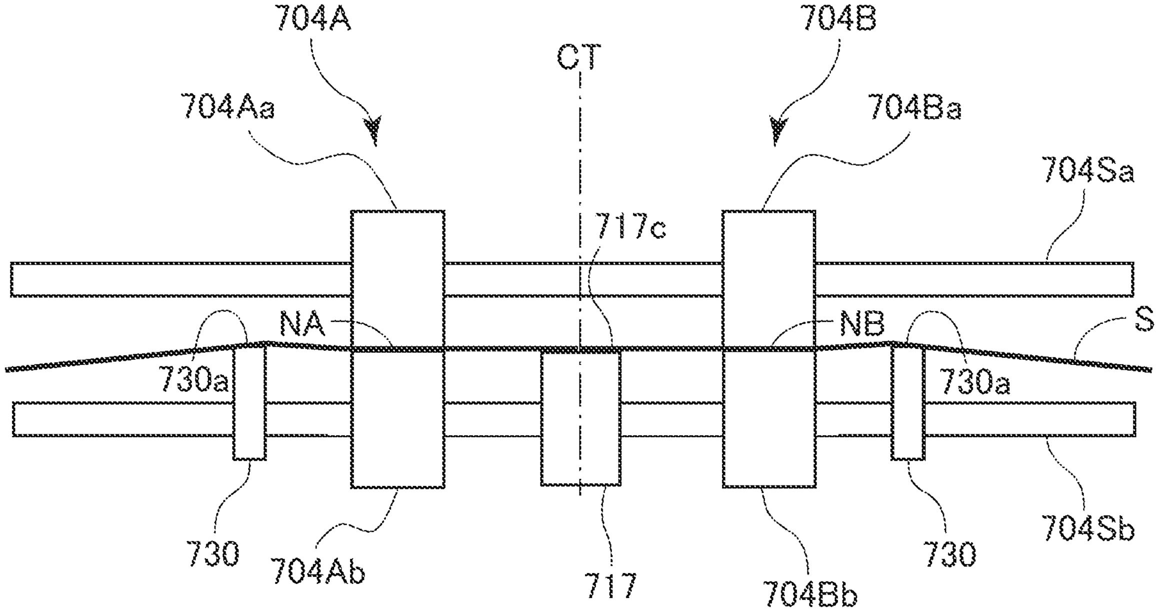
FIG. 7 is a schematic diagram illustrating a side view of sheet discharge roller pairs and stiffening units in a sheet discharge module of a second embodiment.

Next, using FIG. 7, a second embodiment in which the first embodiment described above is partly changed will be described. FIG. 7 is a schematic diagram illustrating a side view of the sheet discharge roller pairs and stiffening units in a sheet discharge module of the second embodiment. To be noted, in the description of the second embodiment, the same reference characters as those used in the first embodiment are employed for similar elements, and the description of those elements will be omitted herein.

As illustrated in FIG. 7, in the sheet discharge module 700 of the second embodiment, as with the first embodiment described above, the stiffening unit 717 is arranged to overlap the conveyance center CT in the sheet width direction. Then, at a position overlapping the stiffening unit 717 when viewed in the sheet width direction, namely substantially at the same position with respect to the sheet discharge direction, stiffening units 730, serving as a second stiffening unit and a third stiffening unit, are arranged outside of the sheet discharge roller pairs 704A and 704B in the sheet width direction. In other words, the stiffening unit 730, serving as the second stiffening unit, is provided on a side opposite to the sheet discharge roller pair 704B with respect to the sheet discharge roller pair 704A in the sheet width direction, and includes an abutment surface 730*a*, serving as a second abutment surface abutting against the sheet S. Also, the stiffening unit 730, serving as the third stiffening unit, is provided on a side opposite to the sheet discharge roller pair 704A with respect to the sheet discharge roller pair 704B in the sheet width direction, and includes an abutment surface 730*a*, serving as a third abutment surface abutting against the sheet S. Then, the stiffening units 730 are arranged at positions at which at least part of each of the stiffening units 730 overlaps the sheet discharge roller pairs 704A and 704B in the sheet discharge direction. Further, the abutment surfaces 730*a* are arranged slightly above the abutment surface 717*c* of the stiffening unit 717 that is arranged at the conveyance center CT. To be noted, while the illustration is omitted, as with the stiffening unit 717, members included in the stiffening units 730 are arranged movably in the vertical direction, and are urged upward by springs.

Since the stiffening units 730 are arranged as described above, the sheet S discharged by the sheet discharge roller pairs 704A and 704B is curved in a wavy manner in the sheet width direction by two stiffening units 730, the first and second nip portions NA and NB, and the stiffening unit 717. Therefore, the sheet S is conveyed in a more stiffened state than in the first embodiment.

Then, as with the first embodiment, the stiffening unit 717 is located at the position overlapping the conveyance center CT in the sheet width direction as described above. That is, the stiffening unit 717 is arranged at the position overlapping the conveyance mechanism 705 (gripper belt 705B and grippers 706*a* and 706*b*) in the sheet width direction. Therefore, the leading edge Sa of the sheet S having been stiffened by the stiffening unit 717 by being pressed upward at the conveyance center CT is conveyed to the position between the gripper belt 705B and the gripper 706*a* or 706*b* without hanging. Thereby, since the leading edge Sa of the sheet S is reliably engaged with and held by the gripper 706*a* or 706*b*, it is possible to improve the alignment of the sheet S stacked on the stacking unit 750.

To be noted, since the configuration, operation, and effects in the second embodiment other than the above are identical to those in the first embodiment, their description will be omitted herein.

According to the present disclosure, it is possible to improve the alignment of the sheet that is stacked on the stacking unit.

Other Embodiments

To be noted, in the first and second embodiments, the stiffening unit 717 possesses a stiffening function with respect to the sheet S. However, it is not limited to this, and, if it is possible to support the sheet S from below and guide the leading edge Sa of the sheet S to the position between the gripper belt 705B and the gripper 706*a* or 706*b*, it is acceptable even without possessing the stiffening function.

Further, while, in the first and second embodiments, the stiffening unit 717 and the conveyance mechanism 705 are arranged on the conveyance center CT. However, it is not limited to this, and these stiffening unit 717 and conveyance mechanism 705 may not need to be arranged on the conveyance center CT. That is, either or both the stiffening unit 717 and the conveyance mechanism 705 may be arranged at positions displaced from the conveyance center CT. Even in this case, it is acceptable if the stiffening unit 717 and the conveyance mechanism 705 are arranged to at least partially overlap in the sheet width direction when viewed in the sheet discharge direction and the vertical direction. Thereby, it is possible to obtain an effect of conveying the leading edge Sa of the sheet S toward the position between the gripper belt 705B and the gripper 706*a* or 706*b*.

Further, in the first and second embodiments, at least part of the stiffening unit 717 is arranged at the position overlapping the sheet discharge roller pairs 704A and 704B in the sheet discharge direction. However, it is not limited to this, and the stiffening unit 717 may be arranged at any position as long as the stiffening unit 717 can convey the leading edge Sa of the sheet toward the position between the gripper belt 705B and the gripper 706*a* or 706*b* while stiffening the sheet S discharged by the sheet discharge roller pairs 704A and 704B.

Further, in the first and second embodiments, the abutment surface 717*c* of the stiffening unit 717 is arranged above the first and second nip portions NA and NB. However, it is not limited to this, and the abutment surface 717*c* may be positioned at the same height as or below the first and second nip portions NA and NB.

Further, while, in the second embodiment, the abutment surfaces 730*a* of the stiffening units 730 are arranged above the abutment surface 717*c* of the stiffening unit 717, it is not limited to this, and the abutment surfaces 730*a* may be arranged at the same height as or below the abutment surface 717*c*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075838, filed May 1, 2023 which is hereby incorporated by reference herein in its entirety.

What is claimed is:

1. A sheet supporting apparatus comprising:

a sheet discharge unit configured to convey a sheet to discharge the sheet;

a conveyance unit including a gripper member configured to engage with a leading edge of the sheet that has been discharged from the sheet discharge unit, the gripper member being disposed in a part of a sheet width direction perpendicular to a sheet discharge direction, the conveyance unit being configured to convey the sheet engaged with the gripper member by moving the gripper member;

a stacking unit on which the sheet that has been conveyed by the conveyance unit is stacked; and a stiffening unit including an abutment surface configured to abut against the sheet conveyed by the sheet discharge unit toward the gripper member, the stiffening unit being configured to stiffen the sheet by curving the sheet when viewed in the sheet discharge direction, the stiffening unit being disposed in a part of the sheet width direction perpendicular to a sheet discharge direction, wherein the stiffening unit is provided at a position where at least part of the stiffening unit overlaps the gripper member in the sheet width direction when viewed in the sheet discharge direction.

2. The sheet supporting apparatus according to claim 1, wherein the abutment surface is configured to abut against an under surface of the sheet conveyed by the sheet discharge unit toward the gripper member, and wherein the stiffening unit is configured to stiffen the sheet by curving the sheet upward when the sheet is viewed in the sheet discharge direction.

3. The sheet supporting apparatus according to claim 1, wherein the sheet discharge unit includes a first roller pair and a second roller pair, wherein the first roller pair includes a first roller and a second roller, the second roller being configured to form a first nip portion by coming into contact with the first roller, wherein the second roller pair includes a third roller and a fourth roller, the fourth roller being configured to form a second nip portion by coming into contact with the third roller, the second roller pair being provided in alignment with the first roller pair in the sheet width direction, and wherein the stiffening unit is provided between the first roller pair and the second roller pair in the sheet width direction and at a position at which at least part of the stiffening unit overlaps both the first roller pair and the second roller pair in the sheet discharge direction when viewed in the sheet width direction.

4. The sheet supporting apparatus according to claim 3, wherein the abutment surface is arranged above both the first nip portion and the second nip portion.

5. The sheet supporting apparatus according to claim 4, further comprising:

a first guide including a first guide surface configured to guide the sheet in the sheet discharge unit; and a second guide including a second guide surface oppositely arranged above the first guide surface, the second guide surface being configured to guide the sheet in the sheet discharge unit, wherein the abutment surface is arranged below the second guide surface at a predetermined position in the sheet discharge direction.

6. The sheet supporting apparatus according to claim 3, wherein the abutment surface is a first abutment surface, wherein the stiffening unit is a first stiffening unit, and wherein the sheet supporting apparatus further includes:

a second stiffening unit including a second abutment surface that is configured to abut against the sheet, the second stiffening unit being provided on a side opposite to the second roller pair with respect to the first roller pair in the sheet width direction.

7. The sheet supporting apparatus according to claim 6, wherein the second abutment surface is arranged above the first abutment surface.

8. The sheet supporting apparatus according to claim 6, further comprising:

a third stiffening unit including a third abutment surface that is configured to abut against the sheet, the third stiffening unit being provided on a side opposite to the first roller pair with respect to the second roller pair in the sheet width direction.

9. The sheet supporting apparatus according to claim 2, wherein the stiffening unit includes a moving member and an urging member, wherein the moving member includes the abutment surface, and is configured to be movable in a vertical direction, and wherein the urging member is configured to urge the moving member upward.

10. The sheet supporting apparatus according to claim 1, further comprising:

a first guide including a first guide surface configured to guide the sheet in the sheet discharge unit; and a second guide including a second guide surface oppositely arranged above the first guide surface, the second guide surface being configured to guide the sheet in the sheet discharge unit, wherein the abutment surface is arranged above the first guide surface at a predetermined position in the sheet discharge direction.

11. The sheet supporting apparatus according to claim 1, wherein the conveyance unit includes a belt on which the gripper member is provided, wherein the belt is supported by a rotary member, and wherein the gripper member is moved by rotation of the belt.

12. The sheet supporting apparatus according to claim 11, wherein the gripper member is configured to engage with the leading edge of the sheet discharged from the sheet discharge unit below a rotation center of the rotary member.

13. The sheet supporting apparatus according to claim 1, wherein the conveyance unit includes a contact portion configured to come into contact with the leading edge of the sheet engaged with the gripper member, and wherein, in a case where the leading edge of the sheet engaged with the gripper member comes into contact with the contact portion, engagement of the gripper member with the sheet is released, and the sheet whose engagement with the gripper member has been released is stacked on the stacking unit.

14. The sheet supporting apparatus according to claim 1, wherein the sheet discharge direction is a horizontal direction.

15. An image forming system comprising:

an image forming apparatus configured to form an image on a sheet; and the sheet supporting apparatus according to claim 1, the sheet supporting apparatus being configured to receive the sheet on which the image has been formed by the image forming apparatus and discharge the sheet from the sheet discharge unit.

16. The sheet supporting apparatus according to claim 8, wherein the second stiffening unit is provided at a position where at least part of the second stiffening unit overlaps both the first roller pair and the second roller pair in the sheet discharge direction when viewed in the sheet width direction, the second stiffening unit being configured to stiffen the sheet by curving the sheet upward, and wherein the third stiffening unit is provided at a position where at least part of the third stiffening unit overlaps both the first roller pair and the second roller pair in the sheet discharge direction when viewed in the sheet width direction, the third stiffening unit being configured to stiffen the sheet by curving the sheet upward.

17. The sheet supporting apparatus according to claim 6, wherein the second abutment surface is configured to abut against an under surface of the sheet conveyed by the sheet discharge unit toward the gripper member, and wherein the second stiffening unit is configured to stiffen the sheet by curving the sheet upward when the sheet is viewed in the sheet discharge direction.

18. The sheet supporting apparatus according to claim 6, wherein the second stiffening unit is disposed at a position that does not overlap the gripper member in the sheet width direction when viewed in the sheet discharge direction.

19. The sheet supporting apparatus according to claim 1, wherein the gripper member has an inclined surface, and a downstream end of the inclined surface in the sheet discharge direction is higher than an upstream end of the inclined surface in the sheet discharge direction, and wherein, in a state in which the gripper member engages with the sheet, the abutment surface of the stiffening unit is disposed above a central position in a height direction of the inclined surface.

* * * * *